United States Patent
Kim (10) Patent No.: US 7,647,040 B2
(45) Date of Patent: Jan. 12, 2010

(54) TERMINAL AND METHOD OF AUTOMATICALLY EXECUTING FUNCTION ESTABLISHMENT THEREOF

(75) Inventor: Jae Eung Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 901 days.

(21) Appl. No.: 11/228,377

(22) Filed: Sep. 16, 2005

(65) Prior Publication Data

US 2006/0068772 A1  Mar. 30, 2006

(30) Foreign Application Priority Data

Sep. 20, 2004  (KR) ............... 10-2004-0075109

(51) Int. Cl.
*H04M 3/00* (2006.01)
(52) U.S. Cl. ............... 455/420; 455/414.4; 455/435.1; 455/435.2; 455/432.3
(58) Field of Classification Search ......... 455/420, 455/414.4, 435.1, 435.2, 432.3; 445/414.4, 445/445

See application file for complete search history.

(56) References Cited

U.S. PATENT DOCUMENTS 6,029,065 A * 2/2000 Shah .................... 455/414.4
6,134,434 A * 10/2000 Krishnamurthi et al. .... 455/419
6,278,875 B1 * 8/2001 Sun ..................... 455/422.1
6,671,508 B1 * 12/2003 Mitsuoka et al. .......... 455/412.1
2007/0152957 A1 * 7/2007 Shibata .................. 345/156

FOREIGN PATENT DOCUMENTS

| GB | 2 305 073 A | 3/1997 |
|---|---|---|
| JP | 2001-285954 | 10/2001 |
| JP | 2003-078636 | 3/2003 |
| KR | 2002-25472 | 9/2000 |
| WO | WO 02/087207 A1 | 10/2002 |

* cited by examiner

*Primary Examiner*—David Q Nguyen
(74) *Attorney, Agent, or Firm*—Lee, Hong, Degerman, Kang & Waimey

(57) ABSTRACT

A terminal and method of automatically executing function establishment thereof are disclosed, by which establishments of supportable services and additional functions can be supported under a user-oriented environment, by which a function establishment of the terminal can be automatically executed according to a user, and by which function establishment contents previously used by a user can be automatically applied to a terminal that is for rent or newly purchased. The present invention includes registering an establishment value used in executing a prescribed terminal function to a communication system, requesting the establishment value to the communication system from a random terminal, receiving the establishment value from the communication system to the terminal, and allowing the terminal to change a previous establishment value of the function previously stored in the terminal using the received establishment value.

34 Claims, 5 Drawing Sheets

FIG. 1

FIG. 2 registration of terminal

FIG. 3

FIG. 4 registration of communication system

FIG. 5 transmission of communication system

TERMINAL AND METHOD OF AUTOMATICALLY EXECUTING FUNCTION ESTABLISHMENT THEREOF

This application claims the benefit of the Korean Patent Application No. 10-2004-0075109, filed on Sep. 20, 2004, which is hereby incorporated by reference as if fully set forth herein.

BACKGROUND OF THE INVENTION

1. Field of the Invention

The present invention relates to a terminal, and more particularly, to a terminal and method of automatically executing function establishment thereof.

2. Discussion of the Related Art

Generally, a user uses his terminal registered with his personal information. Yet, he may occasionally use another person's terminal or a terminal for rent.

And, one terminal can be used by several users.

In case that one user frequently uses the terminal for rent, he would be unable to be always provided with the germinal of the same model or function. So, in worst case, he would be forced to use a terminal of a different model or function each time.

Meanwhile, a terminal, and more particularly, a mobile communication terminal supports various additional services such as a data communication service, a short message service, a wireless Internet service and the like as well as a voice communication service and provides an environment that enables a user to establish various functions required for using the above-explained additional services and the basic voice communication service. Moreover, the mobile communication terminal provides an establishment environment for the additional functions provided to the mobile communication terminal, i.e., the establishment environment of the storage and management of phone numbers, schedules, alarm, melody (bell sound) and personal information. Thus, the mobile communication terminal is provided with various applications for the respective function establishments of the supportable services and the applications for the establishments of the above-explained additional functions as well.

However, the applications used for mobile communication terminals differ from each other according to terminal manufacturers. Besides, in case of terminals made by the same manufacturer, applications for the function establishments may differ according to product models.

Hence, in case that various users use one terminal, in case that a user uses a terminal for rent each time, or in case that a user purchases a new terminal, the corresponding user(s) has no choice but to adapt himself to the new function establishment environment. In other words, the user needs to be accustomed to different conditions and systems for the function establishment each time in using a terminal of a new modem.

SUMMARY OF THE INVENTION

Accordingly, the present invention is directed to a terminal and method of automatically executing function establishment thereof that substantially obviate one or more problems due to limitations and disadvantages of the related art.

An object of the present invention is to provide a terminal and method of automatically executing function establishment thereof, by which establishments of supportable services and additional functions can be supported under a user-oriented environment.

Another object of the present invention is to provide a terminal and method of automatically executing function establishment thereof, by which a function establishment of the terminal can be automatically executed according to a user.

Another object of the present invention is to provide a terminal and method of automatically executing function establishment thereof, by which function establishment contents previously used by a user can be automatically applied to a terminal that is for rent or newly purchased.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of automatically executing a terminal function establishment according to the present invention includes the steps of registering an establishment value used in executing a prescribed terminal function to a communication system, requesting the establishment value to the communication system from a random terminal, receiving the establishment value from the communication system to the terminal, and allowing the terminal to change a previous establishment value of the function previously stored in the terminal using the received establishment value.

In another aspect of the present invention, a terminal includes a transmit module transmitting an establishment value to a communication system for a registration of the establishment value used in executing a prescribed terminal function, a receive module receiving the establishment value registered to the communication system from the communication system, and a control module changing a previous establishment value previously stored in a memory into the received establishment value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a terminal used in the following description of the present invention preferably includes a mobile communication terminal.

The terminal supports various additional services such as a data communication service, a short message service, a wireless Internet service and the like as well as a voice communication service. Specifically, the terminal according to the present invention is provided with at least one or more applications that enable a user to establish functions needed to use the basic voice communication and the above-explained additional services. And, the terminal supports additional functions (storage and management of phone numbers, schedules, alarm, melody (bell sound) and personal information). In particular, the terminal according to the present invention is provided with at least one application to set specific values for the various additional functions.

Meanwhile, the terminal provides its latest function establishment value to a communication system to be registered thereto. And, the terminal is provided with a user's function establishment value registered to the communication system to apply the value to a corresponding function.

The terminal according to the present invention transmits a function establishment value to the communication system in case of the following. In this case, a value of the function establishment parameter corresponds to the function establishment value used in establishing each of the various functions provided to the terminal.

A terminal transmits a function establishment parameter to a communication system each time a specific function establishment is completed in the terminal via a prescribed application.

In making a new registration to a communication system, a terminal transmits a function establishment parameter to the communication system. Yet, it is preferable that a transmission of the function establishment parameter in making the new registration is optional.

In making a registration to a communication system as power of a terminal is turned on, the terminal transmits a function establishment parameter to a communication system.

It is a matter of course that a terminal further transmits identification information uniquely granted to the terminal and/or a user to a communication system together with the above explained function establishment parameter.

If so, the communication system stores the value of the function establishment parameter received from the terminal in an area allocated to the terminal and/or user among various areas of a database or updates a value of a previous function establishment parameter.

Since the terminal further provides the identification information of the terminal and/or user to the communication system in transmitting the function establishment parameter to the communication system, the communication system identifies whom a currently received function establishment parameter belongs to with reference to the received identification information.

Meanwhile, if the terminal transmits a request message including the identification information of the terminal and/or user, i.e., a message requesting a function establishment value, the communication system having received the request message reads a value of the function establishment parameter from the area allocated to the corresponding terminal and/or the corresponding user to provide to the terminal.

Finally, the terminal uses the value of the function establishment parameter provided from the communication system as a value for establishing various functions provided within the terminal. Namely, the value of the function establishment parameter received from the communication system is stored in a memory of the terminal and the stored value of the function establishment parameter is automatically applied to the function establishment.

In the present invention, a communication system transmits a function establishment parameter to a terminal in the following cases.

In case that a new terminal purchased by a user is registered to a communication system, the corresponding communication system transmits a function establishment parameter of a database area allocated to the terminal and/or user to the terminal. In doing so, the communication system confirms whether the user attempts to register a terminal that was not previously registered by the user with reference to terminal and/or user identification information that was previously stored.

As a user turns on power of a terminal, in case that the terminal requests a prescribed registration such as a position registration to a communication system, the communication system transmits a function establishment parameter of a database area allocated to the terminal and/or user.

In case that a user requests a value required for a specific function establishment via an application provided to a terminal, a communication system extracts a function establishment value requested by the user from a database area allocated to the terminal and/or user and then transmits the extracted value as a function establishment parameter to the terminal.

The present invention is explained in detail with reference to the attached drawings as follows.

Figure 1:
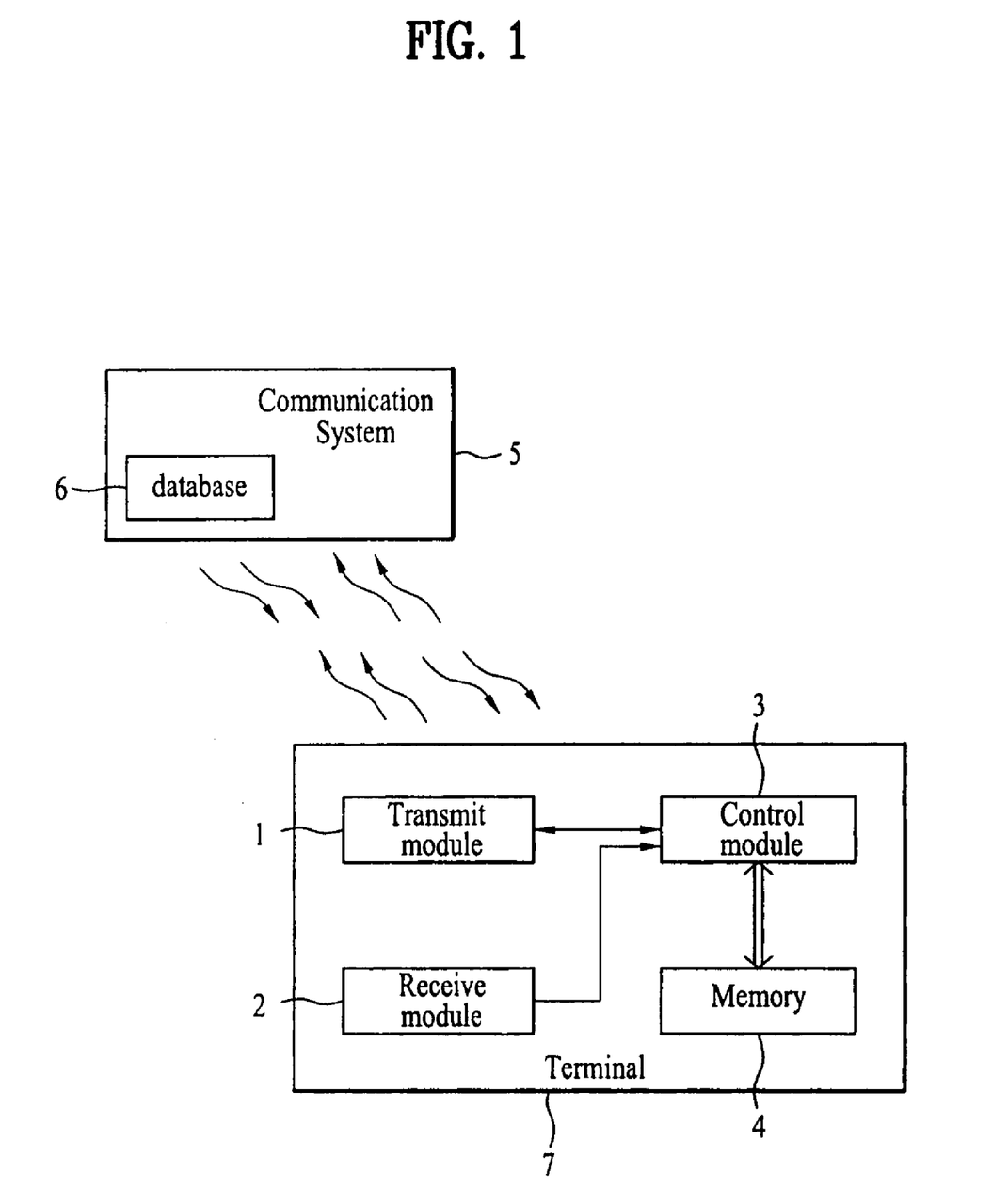
FIG. 1 is a block diagram of a communication network including a terminal and a communication system according to one embodiment of the present invention.

FIG. 1 is a block diagram of a communication network including a terminal and a communication system according to one embodiment of the present invention, in which the terminal preferably includes a mobile communication terminal. And, user identification information used in the following has the same concept of terminal identification information. Moreover, MIN (mobile identification number), ESN (electronic serial number), IMSI (international mobile subscriber identifier) or the like, which is uniquely granted to a user or terminal, is used as the user identification information.

Referring to FIG. 1, a terminal 7 according to the present invention includes a transmit module 1, a receive module 2, a control module 3 and a memory 4.

The transmit module 1 transmits a message requesting a registration for a new use or a message requesting a registration in power-on of the terminal 7 to a communication system. And, such a message is explained as a registration request message in the following. And, the transmit module 1 transmits a registration request message, and more particularly, a message requesting a registration for a new use or a message requesting a registration in power-on of the terminal 7 to request a function establishment parameter value of a corresponding user retained by a communication system 5.

Meanwhile, the transmit module 1 transmits the user identification information to the communication system 5 together with the registration request message. Optionally, the registration request message includes a function establishment parameter value corresponding to function establishment values currently stored in the memory 4 of the terminal 7.

And, if prescribed function establishment values are changed by an application for various function establishments in the terminal 7, the transmit module 1 transmits a function establishment parameter value corresponding to the changed function establishment values to the communication system 5 using a prescribed message. And, the prescribed message will be explained as one registration request message for a request of changing a function establishment value in the following description as well.

The receive module 2 receives a response message to the registration request message having been transmitted to the communication system 5. The function establishment parameter value found based on the user identification information is included in the response message. Yet, in case that the registration request message transmitted from the terminal is the message for a request of changing the function establishment value, it is preferable that the function establishment parameter value is not included in he corresponding response message.

The memory 4 has a default value used for an application for various function establishments. In this case, the default value is the value that is determined for the function establishment in manufacturing or initializing the terminal 7. As each function establishment is changed via the application for the various function establishments, a previous value stored in the memory 4 is updated into a changed value.

And, the memory 4 receives the response message received from the communication system and then stores the function establishment parameter value included in the response message.

The control module 3 executes applications for function establishments of services (voice communication service, data communication service, short message service, wireless Internet service, etc.) supported by the terminal 7, respectively. And, the control module 3 executes applications for establishments of additional functions (storages and managements of phone number, schedule, alarm, melody (bell sound) and personal information) supported by the terminal 7, respectively.

As a prescribed establishment value is changed by the application for the various function establishments, the control module 3 updates a previous establishment value stored in the memory 4 into a lately changed establishment value.

Meanwhile, the control module 3 controls the transmission of the registration request message via the transmit module 1 and controls whether to include which establishment value in the registration request message. In doing so, the control module 3 controls that the user identification information uniquely granted to the terminal or user shall be transmitted together with the registration request message to be transmitted.

And, the control module 3 extracts the function establishment value from the response message received via the receive module 2 and then stores the extracted value in the memory 4. In particular, the control module 3 updates a previous function establishment value stored in the memory into the extracted function establishment value.

Moreover, the control module 3 automatically applies the function establishment value, which is changed via the application for one of the various function establishments, to the corresponding function. Furthermore, the control module 3 automatically applies a latest function establishment value stored in the memory 4 to a corresponding function.

Meanwhile, the communication system 5 according to the present invention includes a database 6 to retain user's identification information and a function establishment parameter value per user in an area corresponding to each user identification information. It is a matter of course that the communication system 5 includes a transceiver module, a control module and the like, which are not explained in the following description).

Preferably, the communication 5 includes a prescribed communication station. For instance, the communication system 5 includes a mobile switching center (MSC), a radio network controller (RNC) or the like.

The communication system 5 according to the present invention receives the registration request message from the terminal 7.

The communication system 5 identifies whether the received registration request message 7 corresponds to a message for requesting a registration for a new use of the terminal 7, a message for requesting a registration in turning on power of the terminal 7, or a message for requesting a registration according to a change of a prescribed function establishment value.

And, the communication system 5 decides that the received registration request message belongs to which user. In doing so, the communication system 5 refers to the area of the database 6 in which the user identification information is stored.

The communication system 5 stores the function establishment parameter value, which is included in the received registration request message, in the database 6. In doing so, the communication system 5 stores the function establishment parameter value in the area allocated to the user (i.e., storage area corresponding to the user identification information among a plurality of areas of the database 6. If a prescribed function establishment parameter value already exists, the communication system 5 updates the existing value into a latest function establishment parameter value.

The communication system 5 transmits a response message in response to the received registration request message to the terminal 7. And, the communication system 5 includes the function establishment parameter value found based on the user identification information in the response message and then transmits the corresponding response message. Yet, it is preferable that the function establishment parameter value is not included in the response message in case that the registration request message for the change request of the function establishment value was received.

For instance, in the present invention, function identification numbers are given to the various additional functions to identify them, respectively. The function identification numbers facilitate an update of the user's function establishment values in part.

Based on the above-explained configuration of the terminal and communication system according to the present invention, various embodiments of the present are explained in detail as follows.

Figure 2:
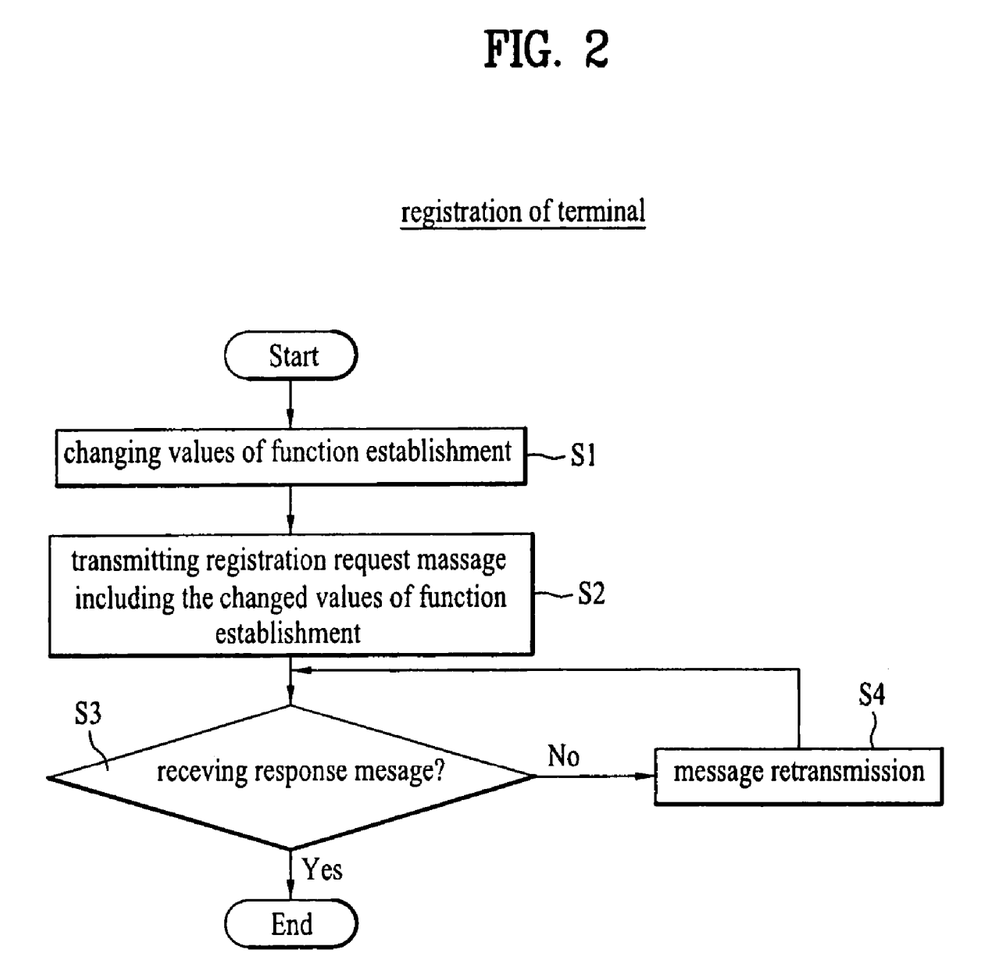
FIG. 2 is a flowchart of a procedure of registering a function establishment value to a communication system from a terminal according to one embodiment of the present invention.

FIG. 2 is a flowchart of a procedure of registering a function establishment value to a communication system from a terminal according to one embodiment of the present invention.

Referring to FIG. 2, if a user partially or entirely changes prescribed functions provided to a terminal via applications for several function establishments of the terminal, the terminal changes an establishment value of the corresponding function (S1).

In particular, if establishments of the prescribed functions provided to the terminal are changed by the user, the terminal changes values of function establishment registers within a memory.

The values of the function establishment registers are located at predetermined independent areas in the memory, respectively. This means that the applications corresponding to the functions provided to the terminal occupy the independent areas within the memory, respectively and also means that the changed establishment value is stored in each of the independent areas.

Thereafter, if the change of the function establishment is terminated in the application for the prescribed function establishment, the terminal transmits a function establishment parameter value corresponding to the changed function establishment value to a communication system (S2). In doing so, the function establishment parameter value is included in a registration request message to be transmitted to the communication system.

And, the terminal transmits the registration request message to the communication system together with identification information of the user. This is to enable the communication system to identify that the registration request message belongs to which user.

Moreover, the terminal transmits the registration request message including the function establishment parameter value to the communication system at a time point as follows.

First of all, the terminal transmits the function establishment parameter value right after the user completes the function establishment.

Secondly, in making a new registration to the communication system or in registering to the communication system as a power of the terminal is turned on, the terminal transmits the function establishment parameter value. Yet, the transmission of the function establishment parameter value in making the new registration is optional.

Thus, in each of the above-explained cases, the terminal transmits the registration request message including the function establishment parameter value to the communication system.

Subsequently, the terminal checks whether a response message is received from the communication system (S3).

If the response message is received after a prescribed duration after completion of the transmission of the registration request message, the terminal extracts a function establishment value from the received response message and then stores the extracted function establishment value in the memory. And, the terminal automatically applies the extracted function establishment value to the corresponding function.

If the response message is not received after the prescribed duration after completion of the transmission of the registration request message, the terminal retransmits the registration request message to the communication system (S4). Yet, for the retransmission of the registration request message, a retransmission count is set by considering an entire load of the terminal and communication system.

Meanwhile, the time point that the terminal transmits the function establishment parameter value to the communication system can be changed or adjusted into an optimal time point by considering the entire load of the terminal and communication system.

Figure 3:
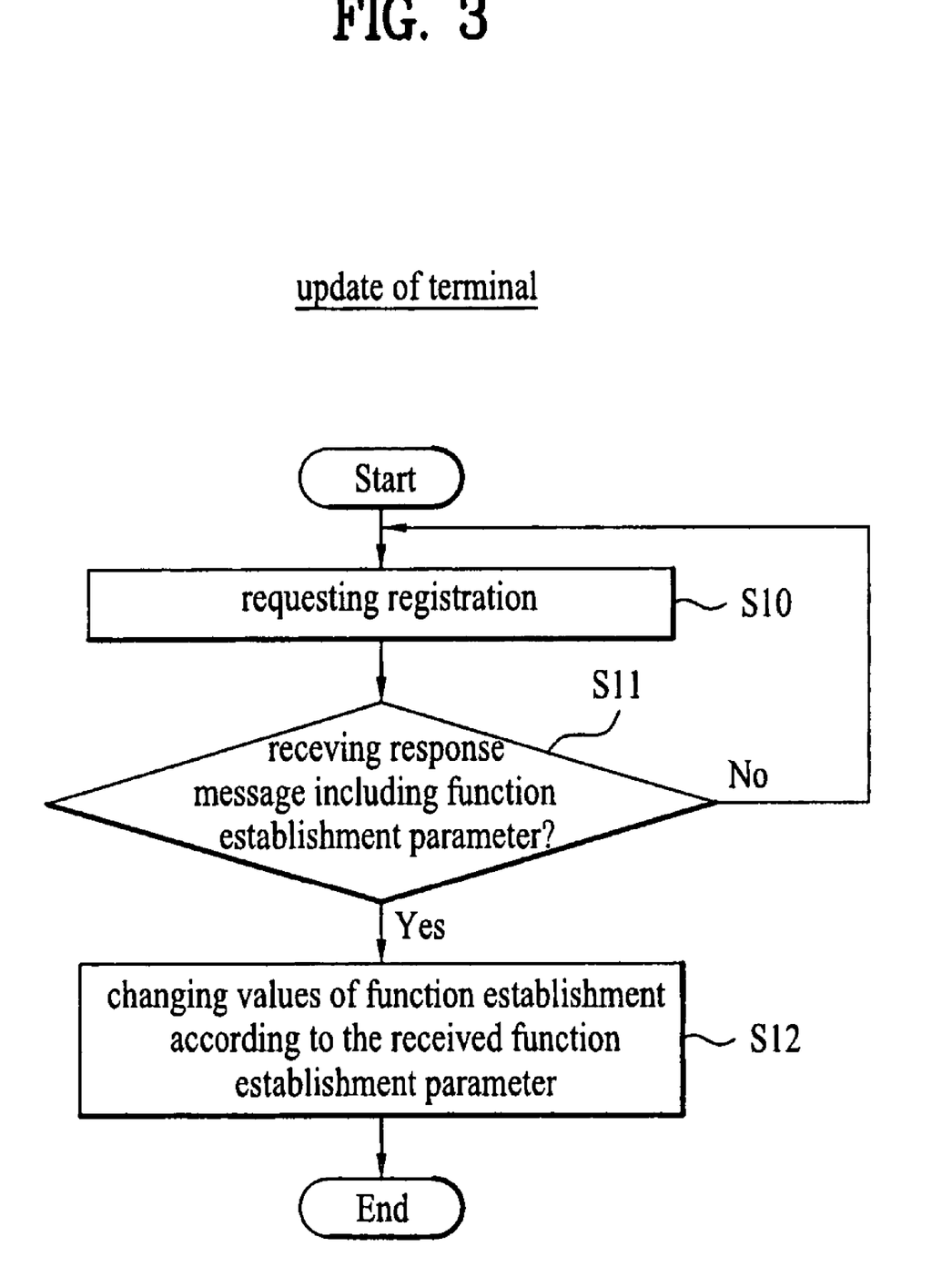
FIG. 3 is a flowchart of a procedure of updating a function establishment value in a terminal according to one embodiment of the present invention.

FIG. 3 is a flowchart of a procedure of updating a function establishment value in a terminal according to one embodiment of the present invention.

Figure 4:
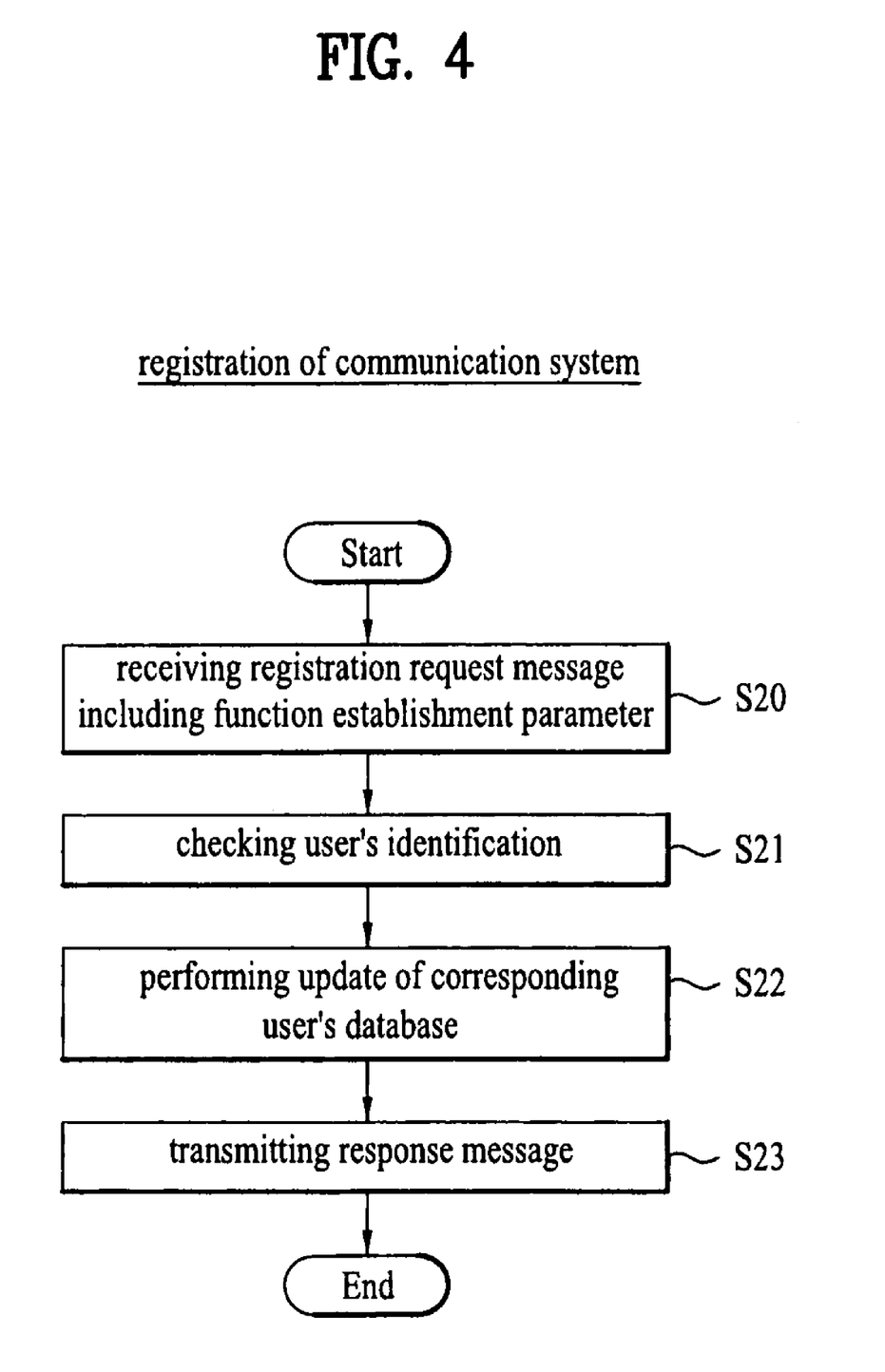
FIG. 4 is a flowchart of a procedure of registering a user's function establishment value in a communication system according to one embodiment of the present invention.

Referring to FIG. 4, a terminal requests a registration to a communication system in each of the following cases (S10).

The terminal makes a new registration to the communication system.

As a power of the terminal is turned on, the terminal is registered to the communication system.

As a function establishment value is changed within the terminal, the changed function establishment value is registered to the communication system. In this case, the terminal uses a registration request message including identification information of a user.

Subsequently, the terminal checks whether a response message is received from the communication system (S11).

If the response message including a function establishment parameter value is received from the communication system, the terminal changes a previous function establishment value previously stored in a memory according to the function establishment parameter value included in the response message (S12). In this case, the function establishment parameter value provided from the communication system is previously registered to the communication system by the user.

On the other hand, if the response message including the function establishment parameter value is not received from the communication system within a predetermined duration, the terminal requests the above-explained registration several times more.

FIG. 4 is a flowchart of a procedure of registering a user's function establishment value in a communication system according to one embodiment of the present invention.

Referring to FIG. 4, a communication system receives a registration request message from a terminal (S20). And, the registration request message may include a function establishment parameter value in some cases.

Once the registration request message is received, the communication system identifies whether the received registration request message is a message for requesting a registration for a new use, a message for requesting a registration in turning on a power of the terminal or a message for requesting a registration according to a change of a prescribed function establishment value. In this case, it is preferable that the message for requesting the registration according to the change of the prescribed function establishment value should include the function establishment parameter value.

Simultaneously, the communication system checks user's identification information received from the terminal together with the registration request message (S21). Hence, the communication system identifies a user from the user's identification information, correspondingly. Namely, based on the received user's identification information, the communication system decides that the currently received registration request message belongs to which user.

And, the communication system updates a previous function establishment parameter value previously stored in a database area of the identified user using the function establishment parameter value included in the received registration request message (S22). Such an update is preferably carried out in case that the registration request message corresponds to the case for of the registration according to the change of the prescribed function establishment value. Yet, in the present invention, in the case of requesting the registration for the new use or in the case of requesting the registration in turning on the power of the terminal, the communication system updates the previous information previously stored in a database area of a corresponding user to change information associated with function establishment.

In case that a user is a new subscriber, the communication system allocates a partial area of the database to the new subscriber. And, the communication system stores the function establishment parameter value included in the registration request message in the allocated area.

Finally, the communication system transmits a response message in response to the received registration request message to the terminal (S23). In some cases, the response message may include the function establishment parameter value. Namely, in response to the registration request message for the registration of the new use or the registration request message for the registration in turning on the power of the terminal, the function establishment parameter value stored in the database area of the corresponding user is included in the response message.

Figure 5:
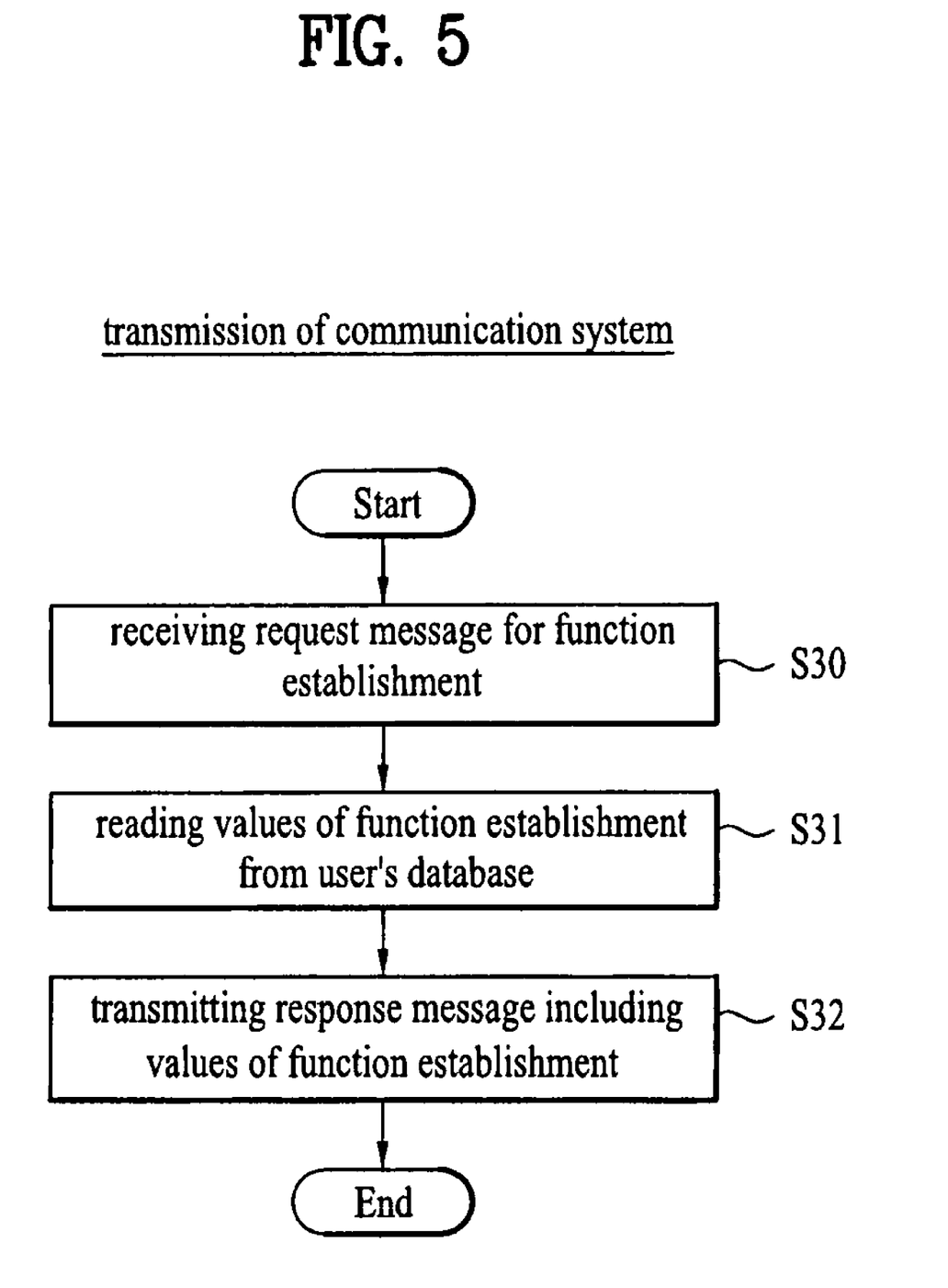
FIG. 5 is a flowchart of a procedure of transmitting a user's function establishment value in a communication system according to one embodiment of the present invention.

FIG. 5 is a flowchart of a procedure of transmitting a user's function establishment value in a communication system according to one embodiment of the present invention.

Referring to FIG. 5, a communication system receives a request message for a function establishment from a terminal (S30). In this case, the request message corresponds to a registration request message used in case of requesting a registration for a new use or to another registration request message used in case of requesting a registration in turning on power of the terminal.

Once the request message is received, the communication system identifies a user from user's identification information received from the terminal together with the request message.

Namely, the communication system decides that the currently received request message belongs to which user based on the received user's identification information.

And, the communication system reads a user's function establishment value previously stored in a database area of the identified user (S31).

Subsequently, the communication system transmits a response message including the read function establishment value to the terminal (S32).

Hence, the user is provided with function establishment values established in using a previous terminal from the communication system and then directly applies the provided function establishment values to a current terminal to use.

Meanwhile, for the terminals manufactured by different manufacturers or for the terminals having different functions, the present invention guarantees superiority if standardization is carried out on function species, function establishment system, establishment value size, application used in function establishment and the like.

To prepare for the case that the function species, function establishment systems, function establishment value sizes or applications used in the function establishment differ from each other according to the terminals manufactured by different manufacturers or according to the terminals having different functions, the present invention uses the identification number per function. Hence, in case of being provided with the function establishment parameter values from the communication system, the terminal updates the function establishment parameter value having the identification number coinciding with the various supportable functions among the provided function establishment parameter values and then applies them to the function execution only. If so, the terminal ignores the function establishment value having the identification number failing in coinciding with the various supportable functions among the function establishment parameter values provided from the communication system.

Like the GSM or CDMA terminal, in case that a common use of the terminal is generalized or in case that a market for a terminal for rent is more activated, the demand for an environment enabling a unique function establishment per user will rise.

Accordingly, the present invention can be utilized in such an environment.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of automatically executing a terminal function establishment, the method comprising the steps of:
    registering a first establishment value with a communication system, the first establishment value for use in executing a prescribed terminal function at a first terminal;
    requesting by a second terminal the first establishment value stored in the communication system;
    receiving at the second terminal the first establishment value from the communication system; and
    allowing the second terminal to change a second establishment value previously stored in the second terminal using the received first establishment value,
    wherein the requesting comprises transmitting identification information of the second terminal to the communication system.

2. The method of claim 1, wherein the first establishment value is a value according to a change of the prescribed terminal function.

3. The method of claim 1, wherein the identification information comprises a mobile identification number (MIN).

4. The method of claim 1, wherein the identification information comprises an electronic serial number (ESN).

5. The method of claim 1, further comprising making a new registration to the communication system, the new registration including requesting by the second terminal the first establishment value using the identification information of the second terminal.

6. The method of claim 1 further comprising making a registration to the communication system when turning on a power of the second terminal, the second terminal requests the first establishment value using the identification information of the second terminal.

7. The method of claim 1, wherein the first establishment value is registered to the communication system using the identification information of the first terminal.

8. The method of claim 1, wherein the registering comprises storing the first establishment value in a database area allocated to the user of the first terminal.

9. The method of claim 8, wherein the database area is an area corresponding to the identification information given of the first terminal.

10. A terminal comprising:
    a control module configured to change a parameter corresponding to a function of the terminal with a first establishment value;
    a transmit module transmitting the first establishment value to a communication system to register the first establishment value used in executing a prescribed terminal function; and
    a receive module receiving the first establishment value registered to the communication system from the communication system,
    wherein the control module changes a second establishment value previously stored in a memory of the terminal using the received first establishment value and requests an offer of the first establishment value registered to the communication system using an identification information of the terminal.

11. The terminal of claim 10, wherein the control module transmits a changed establishment value to the communication system each time an establishment value of the prescribed terminal function is changed.

12. The terminal of claim 10, wherein the control module transmits a corresponding establishment value to the communication system when the terminal makes a new registration to the communication system.

13. The terminal of claim 10, wherein the control module transmits a corresponding establishment value to the communication system when the terminal makes a registration to the communication system when turning on a power of the terminal.

14. The terminal of claim 10, wherein the control module stores a changed establishment value in the memory each time an establishment value of the prescribed terminal function is changed.

15. The terminal of claim 10, wherein the identification information is a mobile identification number (MIN).

16. The terminal of claim 10, wherein the identification information is an electronic serial number (ESN).

17. The terminal of claim 10, wherein the control module requests the offer of the first establishment value when the terminal makes a new registration to the communication system.

18. The terminal of claim 10, wherein the control module requests the offer of the first establishment value when the terminal makes a registration to the communication system when turning on a power of the terminal.

19. The terminal of claim 10, wherein the communication system comprises a database to store an identification information given to a user of the terminal and to store the establishment value at a location in the database corresponding to the identification information of the user.

20. A terminal management system comprising:
a plurality of terminals supporting data communication through a communication network; and
a terminal manager communicating with said plurality of terminals through said communication network to execute a terminal function establishment at each of the plurality of terminals;
wherein at least one of the plurality of terminals registers the terminal function establishment thereby updating the communication network when storing the terminal function establishment,
wherein each of said plurality of terminals stores, in said terminal manager, function establishment information regarding functions of the terminal, so that said terminal manager transmits said function establishment information to at least one other terminal of said plurality of terminals.

21. A terminal management system comprising:
a plurality of terminals supporting data communication through a communication network; and
a terminal manager communicating with said plurality of terminals through said communication network to execute a function establishment information at each of the plurality of terminals,
wherein at least one of the plurality of terminals registers the function establishment information thereby updating the communication network when storing the function establishment information,
wherein each of said plurality of terminals comprises:
a function controller executing various functions based upon the function establishment information, and
a function establishment information manager transmitting to said terminal manager a first request to register said function establishment information, or transmitting to said terminal manager a second request to update said function establishment information received from said terminal manager.

22. The terminal management system of claim 21, the terminal manager, comprising:
a function establishment information registration module configured to register the function establishment information included in a registration request from a terminal; and
a function establishment information transmit module configured to transmit said function establishment information based upon a request for said function establishment information from said terminal or at least one other terminal of said plurality of terminals.

23. The terminal management system of claim 21, wherein said registration request includes identification information regarding at least one of the plurality of terminals or a terminal user.

24. The terminal management system of claim 23, wherein said second request for update includes said identification information.

25. The terminal management system of claim 22, wherein said function establishment information registration module obtains the function establishment information corresponding to an identification information involved in said second request for update.

26. The terminal management system of claim 23, wherein said identification information involves Mobile Identification Number (MIN), which is unique to each of said plurality of terminals.

27. The terminal management system of claim 23, wherein said identification information involves Electronic Serial Number (ESN), which is unique to each of said plurality of terminals.

28. The terminal management system of claim 21, wherein each of said plurality of terminals further comprises a controller configured to change the function establishment information stored in a memory of said terminal.

29. The terminal management system of claim 22, wherein said function establishment information manager transmits to said terminal manager said first request that includes a changed function establishment information replacing said function establishment information.

30. The terminal management system of claim 21, wherein said function establishment information manager transmits to said terminal manager said first request that includes said function establishment information as power of the terminal is switched on.

31. The terminal management system of claim 22, wherein said function establishment information manager transmits to said terminal manager said first request that includes said function establishment information in a memory as the terminal is switched on.

32. A terminal used in a terminal management system having a plurality of terminals supporting data communication through a communication network, and a terminal manager communicating with said plurality of terminals through said communication network to execute a terminal function establishment at each of the plurality of terminals, said each of said plurality of terminals comprising:
a function controller executing various functions based upon information of the terminal function establishment; and a function establishment information manager transmitting to said terminal manager a first request to register said information of said terminal function establishment, or transmitting to said terminal manager a second request to update said information of said terminal function establishment received from said terminal manager, wherein at least one of the plurality of terminals registers the terminal function establishment thereby updating the communication network when storing the terminal function establishment.

33. A terminal manager used in a terminal management system having a plurality of terminals supporting data communication through a communication network, and said terminal manager communicating with said plurality of terminals through said communication network to execute a terminal function establishment information at each of the plurality of terminals, said terminal manager comprising:

a function establishment information registration module registering the terminal function establishment information included in a registration request from a terminal; and a function establishment information transmitter transmitting said terminal function establishment information based upon an update request from at least one of said plurality of terminals, wherein at least one of the plurality of terminals registers the terminal function establishment information thereby updating the communication network when storing the terminal function establishment information.

34. A method used in a terminal management system comprising a plurality of terminals supporting data communication through a communication network, and a terminal manager communicating with said plurality of terminals through said communication network to execute a terminal function establishment information at each of the plurality of terminals, said method comprising steps of:

transmitting to said terminal manager a registration request including said terminal function establishment information, or transmitting from said terminal of said plurality of terminals to said terminal manager an update request to update said terminal function establishment information received from said terminal manager; and registering at said terminal manager the terminal function establishment information included in said registration request from said terminal, or transmitting said function establishment information based upon said update request for update from said plurality of terminals, wherein at least one of the plurality of terminals registers the terminal function establishment information thereby updating the communication network when storing the terminal function establishment information.

* * * * *